US010383185B2

(12) United States Patent
Guth

(10) Patent No.: US 10,383,185 B2
(45) Date of Patent: Aug. 13, 2019

(54) MOTOR VEHICLE ILLUMINATION DEVICE

(71) Applicant: ZKW GROUP GMBH, Wieselburg (AT)

(72) Inventor: Christian Guth, Mariasdorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/098,897

(22) PCT Filed: May 5, 2017

(86) PCT No.: PCT/AT2017/060119
§ 371 (c)(1),
(2) Date: Nov. 19, 2018

(87) PCT Pub. No.: WO2017/190172
PCT Pub. Date: Nov. 9, 2017

(65) Prior Publication Data
US 2019/0159307 A1 May 23, 2019

(30) Foreign Application Priority Data

May 6, 2016 (AT) .................................. 50417/2016

(51) Int. Cl.
H05B 33/08 (2006.01)
H02M 3/156 (2006.01)
(Continued)

(52) U.S. Cl.
CPC ........ *H05B 33/0815* (2013.01); *H02M 3/156* (2013.01); *H05B 33/083* (2013.01);
(Continued)

(58) Field of Classification Search
CPC ............ H05B 33/0815; H05B 33/0845; H05B 33/083; H05B 33/0827; H05B 33/0824;
(Continued)

(56) References Cited

U.S. PATENT DOCUMENTS

2006/0038803 A1 2/2006 Miller et al.
2012/0194164 A1* 8/2012 Logiudice ............. H02M 3/005
323/312

(Continued)

FOREIGN PATENT DOCUMENTS

DE 10103611 A1 8/2002
EP 2670218 A1 12/2013
WO 2014095173 A1 6/2014

OTHER PUBLICATIONS

International Search Report for PCT/AT2017/060119, dated Jun. 26, 2017 (11 pages).

(Continued)

*Primary Examiner* — Alexander H Taningco
*Assistant Examiner* — Renan Luque
(74) *Attorney, Agent, or Firm* — Eversheds Sutherland (US) LLP

(57) ABSTRACT

A motor vehicle lighting device comprising at least one branch of semiconductor light sources including two or more light source units connected in series is disclosed herein. A MOSFET switch bridging the individual light source units is assigned to the light source units. The at least one branch is fed from the output voltage of a DC/DC converter with respect to ground. An activation circuit is assigned to the MOSFET switch for activating the MOSFET switch, which is a p-channel MOSFET. A rectifier circuit is assigned to the DC/DC converter. The input of the rectifier circuit is connected to a pole of a storage inductor of the converter, at which negative voltage pulses occur with respect to ground. The rectifier circuit is designed to rectify the negative pulses and to provide the resulting negative DC voltage of the activation circuit for switching the MOSFET switch.

9 Claims, 1 Drawing Sheet

Figure 1:
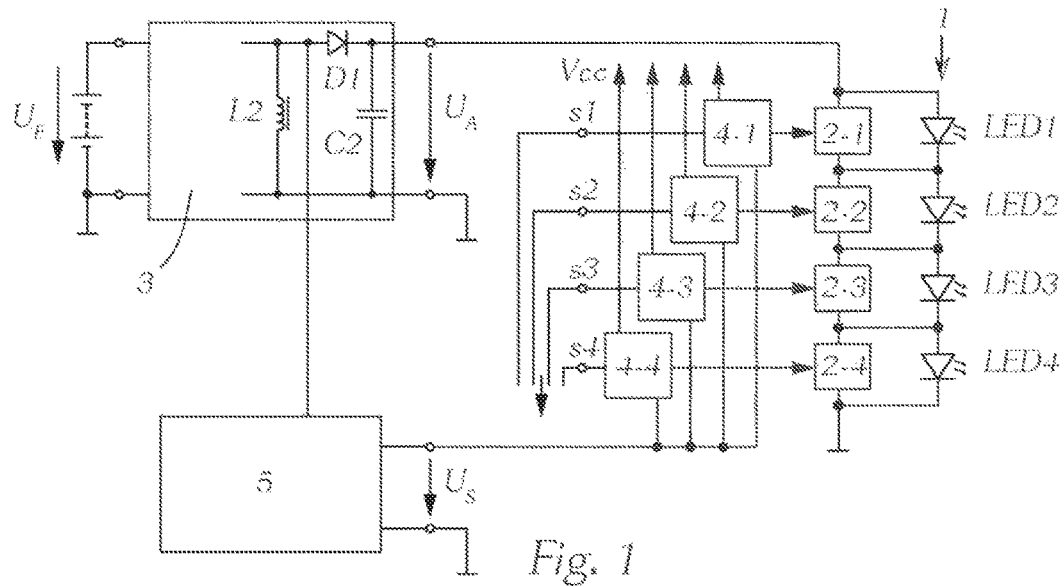

(51) Int. Cl.
*B60Q 1/04* (2006.01)
*H02M 7/06* (2006.01)
*H02M 1/14* (2006.01)

(52) U.S. Cl.
CPC ........... *H05B 33/0845* (2013.01); *B60Q 1/04* (2013.01); *H02M 1/14* (2013.01); *H02M 7/06* (2013.01)

(58) Field of Classification Search
CPC .......... H02M 3/156; H02M 1/14; H02M 7/06; H02M 2003/1557; H02M 3/005; B60Q 1/04
See application file for complete search history.

(56) References Cited

U.S. PATENT DOCUMENTS

| | | | |
|---|---|---|---|
| 2015/0115816 A1* | 4/2015 | Bradford | H05B 33/0827 315/192 |
| 2015/0230302 A1 | 8/2015 | Ito et al. | |
| 2015/0257223 A1* | 9/2015 | Siessegger | H05B 33/0818 315/186 |
| 2017/0170746 A1* | 6/2017 | Benabdelaziz | H02M 1/32 |
| 2018/0138800 A1* | 5/2018 | Chau | H02M 3/337 |
| 2019/0008010 A1* | 1/2019 | Tsuchiya | B60Q 1/00 |

OTHER PUBLICATIONS

Office Action for Austrian Application No. A 50417/2016, dated Nov. 9, 2016 (3 pages).

\* cited by examiner

MOTOR VEHICLE ILLUMINATION DEVICE

The invention relates to a motor vehicle lighting device, comprising at least one branch of semiconductor light sources which includes two or more light source units connected in series, wherein a MOSFET switch bridging the individual light source units is assigned to these, and the at least one branch is fed by the output voltage of a DC/DC converter with respect to ground, wherein an activation circuit is assigned to each MOSFET switch for activating the same.

On motor vehicle lighting devices of this kind, such as headlights, a number of light source units are provided, which are switched on or off individually to implement complex light functions, such as matrix or cornering light functions or are periodically cycled within the meaning of dimming. The light sources used are usually LEDs or laser diodes, the latter often together with light conversion means. The term "light source units" used herein shall be understood to mean that this also encompasses the series circuits of combinations of individual light sources connected in series and/or in parallel, such as LEDs, wherein such a combination forms a light source unit.

In principle, all common circuitry concepts are based on bridging the light source units to be activated/deactivated, such as an LED, by way of a semiconductor switch, whereby the current flows across the switch instead of across the LED. In general, MOSFETs, bipolar transistors or fully integrated IC solutions serve as semiconductor switches.

Additionally, present motor vehicle lighting devices have the problem that, in general, only DC/DC converters that are able to provide regulation to voltages greater and less in magnitude than the input voltage, such as Ćuk converters or SEPIC converters, can be used in the case of a changing LED number and the attendant varying LED strand voltage.

One problem that occurs is that of providing the voltage levels necessary for the switches and adapting these to the dynamically changing switching thresholds of the individual switches to as to be able to utilize the functionality of all possible LED combinations to the full extent. Common solutions, at times, result in high power dissipation in the implementation, or they have a limited scope of functions or are too complicated for special applications with respect to the costs and the number of components. For example, the activation of frequently used n-channel MOSFETs is associated with relatively high power dissipation, and a charge pump is therefore often required. Solutions that include transformers or optocouplers, which are possible in principle, are expensive and difficult to implement in the automotive field, which also applies to fully integrated solutions.

WO 2014/095173 describes an activation circuit for a field effect transistor, which is connected in parallel to an LED. So as to enable activation that operates quickly and is not susceptible to interferences and voltage fluctuations, a current mirror fed by a dedicated voltage source and a level converter for activation signals are provided. The underlying problem of the invention that occurs with the use of two or more LEDs connected in series is not described or solved in this document.

Document US 2006/038803 A1 relates to an activation circuit for a branch comprising multiple LEDs, wherein a FET switch is connected in parallel to each LED. The current flowing through the LED branch is maintained constant by a controller; however, each LED or the FET switch assigned thereto can be activated separately by a microcontroller. A solution for providing a DC voltage for the activation circuit of the LEDs from a DC/DC converter cannot be found in this document.

It is an object of the invention to obtain a fully functionally reliable, yet cost-effective solution to the above-described problems for a motor vehicle lighting device of the kind in question here.

This object is achieved by a motor vehicle lighting device of the type described at the outset, in which, according to the invention, each MOSFET switch is a p-channel MOSFET, a rectifier circuit is assigned to the DC/DC converter, the input of the rectifier circuit being connected to a pole of a storage inductor of the converter at which negative voltage pulses occur with respect to ground, and the rectifier circuit is designed to rectify the negative pulses and to provide the resulting negative DC voltage to the activation circuit for switching the respective MOSFET.

The invention results in a cost-effective solution, which also allows multiple LEDs to be bridged simultaneously, something that is not possible with integrated concepts, for example. Furthermore, it is also possible to activate those MOSFETs without difficulty in which the source is at ground potential.

In expedient variants, it is provided that the DC/DC converter is a Ćuk converter or a SEPIC converter.

A cost-effective solution provides that the rectifier circuit includes a rectifier diode for generating the DC voltage.

Furthermore, it is advantageous if the rectifier circuit additionally comprises filter means for the DC voltage.

It is also highly recommended for the rectifier circuit to comprise stabilizing means for the DC voltage.

In a practical design, it is provided that each activation circuit comprises an npn transistor operated in a common collector configuration, the collector of the transistor being connected to the gate of the associated MOSFET switch.

In this case, it is furthermore recommended to connect a small signal pnp transistor upstream of the npn transistor.

An expedient starting point for the entire activation is when a microcontroller is provided, having outputs leading to activation circuits for the MOSFET switches.

Figure 2:
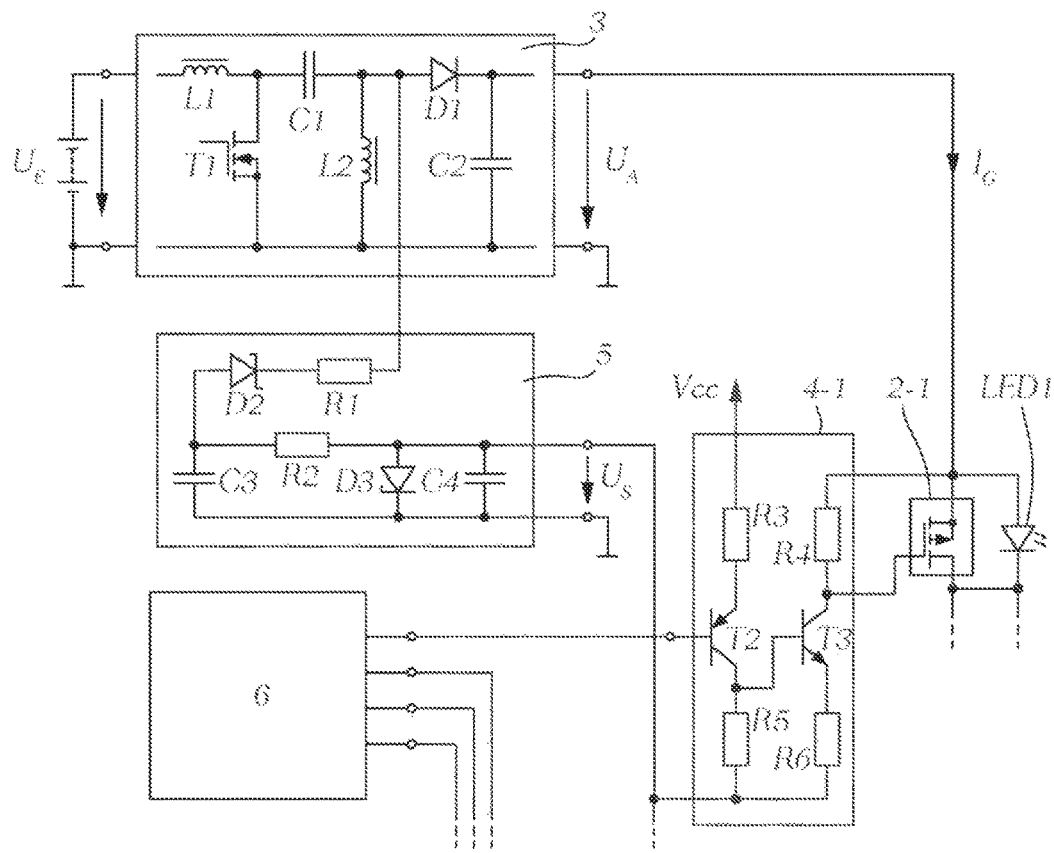

The invention, along with further advantages, will be described in greater detail hereafter based on exemplary embodiments, which are illustrated in the drawings. In the drawings:

FIG. 1 shows a simplified block diagram of the basic design of the invention; and FIG. 2 is a more detailed illustration of further details of one embodiment of the invention.

The block diagram according to FIG. 1 shows a schematic and simplified illustration of the essential elements of the activation of a motor vehicle lighting device according to the invention. Shown is a branch 1, comprising four semiconductor light source units LED1 to LED4 connected in series in this example, wherein a MOSFET switch 2-1 to 2-4 bridging the light source units is assigned to each light source unit. The branch 1 is fed by the output voltage UA of a DC/DC converter 3 with respect to ground, wherein an activation circuit 4-1 to 4-4 is assigned to each MOSFET switch 2-1 to 2-4 for the activation thereof. The input voltage UE of the DC/DC converter 3 is generally withdrawn from the onboard electrical system of a motor vehicle. The activation circuits 4-1 to 4-4 receive a supply voltage VCC of +5V, for example. As will be shown and described in greater detail hereafter, switch signals s1 to s4 are supplied to the activation circuits 4-1 to 4-4.

As was already mentioned at the outset, preferably LEDs or laser diodes are used as semiconductor light source units, and often these are used together with light conversion means. The term "light source units" used herein shall be understood to mean that, in principle, each of the light source units LED1 to LED4 can also encompass a combination of individual light sources connected in series and/or in parallel, such as LEDs. Even though four light source units LED1 to LED4 are shown in the branch 1 here, this number may differ, and the lighting device may also comprise multiple such branches.

According to the invention, a p-channel MOSFET is assigned to each MOSFET switch 2-1 to 2-4, and a rectifier circuit 5 is assigned to the DC/DC converter 3, the input of the rectifier circuit being connected to a pole of a storage inductor L2 of the converter, which will be described in greater detail hereafter, at which negative voltage pulses occur with respect to ground. The rectifier circuit 5 is designed to rectify the negative pulses and to provide the resulting negative DC voltage US of the activation circuit as a switching voltage for switching the respective MOSFET 2-1 to 2-4. Each MOSFET switch 2-1 to 2-4 is to bridge the current across the respective light source units LED1 to LED4 and thus be able to switch these off or dim the brightness thereof in a pulse width-modulated manner.

Advantageously, the DC/DC converter 3 is able to set the output voltage UA not only higher, but also lower than the input voltage UE, wherein the output voltage UA is regulated in such a way that the light source units LED1 to LED4 are operated at the necessary operating point of the desired supply current IG. For example, it is possible to use SEPIC converters or Ćuk converters as converters known in the expert community, in which the topology creates a negative voltage at a storage choke, which is essential for the implementation of the invention. A Ćuk converter may also have an insulating design comprising a transformer.

FIG. 2 shows a detailed design of the activation according to the invention. The DC/DC converter 3 is designed as a SEPIC converter here, which comprises three energy stores in the known manner, these being two inductors L1, L2 and one capacitor C1. The inductors can be arranged on a shared coil body. The capacitor C1 charged to the input voltage UE transfers the energy thereof to the inductor L2 during the phase in which the semiconductor switch T1 is switched off. A negative voltage, which is supplied to the rectifier circuit 5, is created thereby between the diode D1, which in this phase is reverse biased, and the capacitor C1 or the inductor L2.

The rectifier circuit 5 comprises a diode capacitor network D2, C3 on the input side so as to tap and rectify the negative voltage. The diode D2 prevents a downstream capacitor C3 from charging to a positive voltage when the diode D1 is forward biased, and thus acts as a rectifier diode. A Zener diode D2 on the output side is used to stabilize the voltage, wherein the voltage that is above the breakdown voltage of this Zener diode D3 is dissipated. The resistors R1 and R2 are used for current limitation. A capacitor C4 at the output of the rectifier circuit 5 increases the stabilizing effect and reduces residual ripples. The output voltage US thus dependent on the breakdown voltage of the Zener diode D3 can be provided as a switching voltage for switching the MOSFET switches 2-1 to 2-4 for the activation circuits 4-1 to 4-4.

As is shown for the activation circuit 4-1, each of these activation circuits 4-1 to 4-4 is composed of an npn transistor T3 operated in a common collector configuration with an upstream transistor T2, for example, which is controlled as a small signal transistor by a microcontroller 6, so as to switch the basis of the transistor T3 between a positive voltage and the negative voltage US provided by the rectifier circuit 5. The collector of the transistor T3 is the output of the activation circuit 4-1 and is thus present at the gate of the associated MOSFET switch 2-1.

In the present case, the positive voltage shall be the resulting voltage from the supply voltage VCC, for example +5V, minus the voltage drops across R3 and T2, and the negative voltage US shall be −5V. When the microcontroller 6 switches to a "high" logic state (5V), the transistor T2 blocks the current, and the base voltage of the transistor T3 is −5V across the resistor R5. The MOSFET switch 2-1 is not activated since no current flows, and thus no voltage drop occurs across the resistor R4. When the microcontroller, in contrast, switches the base voltage of the transistor T2 to a "low" logic state (0V), a constant current flows in the branch comprising the resistor R6, and accordingly a constant voltage drops across the resistor R4, which has a lower potential at the collector of the transistor T3, and thus at the gate input of the p-channel MOSFET switch 2-1, than at the source electrode thereof. In this case, the MOSFET switch 2-1 closes and bridges the light source unit LED1.

In the present case, the voltage US is stabilized in the rectifier circuit 5 by way of the Zener diode D3; however, it should be clear that this shall not be understood to be of a limiting nature for the invention. Rather, voltage stabilization can also take place, for example, by way of a linear regulator, for example using an operational amplifier.

As was already indicated, it is also not absolutely essential to arrange the semiconductor light source units LED1 to LED4 in a single branch. The semiconductor light source units could also be divided among two branches, for example. It is also possible for an output of the microcontroller 6 to simultaneously activate two or more of the activation circuits 4-1 to 4-4. The number of semiconductor light source units can be arbitrarily selected, of course, and is not limited to four, as shown in the example.

What is essential for the invention is that a negative voltage is tapped at the DC/DC converter 3 so as to gain a stable negative voltage therefrom, which can be used to activate the MOSFET switches 2-1 to 2-4. The shown elements for providing and for stabilizing the negative voltage represent only an exemplary embodiment, which in the present shown example in any case is a cost-effective and also efficient solution and thus, in conjunction with the described invention, has particular advantages.

Additionally, it is up to the person skilled in the art carrying out the invention to select the additional switch elements, wherein further filter elements and protective elements are possible, for example, but are not shown for the sake of clarity.

The invention claimed is:
1. A motor vehicle lighting device, comprising:
at least one branch (1) of semiconductor light sources comprising two or more light source units (LED1 to LED4) connected in series; and
a MOSFET switch (2-1 to 2-4) bridging one of the two or more light source units, the at least one branch being fed by an output voltage ($U_A$) of a DC/DC converter (3) with respect to ground, an activation circuit (4-1 to 4-4) assigned to the MOSFET switch for activating the MOSFET switch,
wherein:
the MOSFET switch (2-1 to 2-4) is a p-channel MOSFET, a rectifier circuit (5) is assigned to the DC/DC converter (3), an input of the rectifier circuit being connected to a pole of a storage inductor (L2) of the DC/DC converter, at which negative voltage pulses occur with respect to ground, and the rectifier circuit (5) is configured to rectify the negative voltage pulses and to provide a resulting negative DC voltage (Us) of the activation circuit (4-1 to 4-4) for switching the MOSFET switch.

2. The motor vehicle lighting device according to claim 1, wherein the DC/DC converter (3) is a Ćuk converter.

3. The motor vehicle lighting device according to claim 1, wherein the DC/DC converter (3) is a SEPIC converter.

4. The motor vehicle lighting device according to claim 1, wherein the rectifier circuit (5) comprises a rectifier diode (D2) for generating the DC voltage (Us).

5. The motor vehicle lighting device according to claim 1, wherein the rectifier circuit (5) comprises filter means (C3, C4) for the DC voltage (Us).

6. The motor vehicle lighting device according to claim 1, wherein the rectifier circuit (5) comprises stabilizing means (D3) for the DC voltage (Us).

7. The motor vehicle lighting device according to claim 1, wherein the activation circuit (4-1 to 4-4) assigned to the MOFSET switch comprises an npn transistor (T3) operated in a common collector configuration, the common collector configuration of the npn transistor being connected to a gate of the MOSFET switch (2-1).

8. The motor vehicle lighting device according to claim 7, wherein a small signal pnp transistor (T2) is connected upstream of the npn transistor (T3).

9. The motor vehicle lighting device according to claim 1, further comprising a microcontroller (6) having outputs leading to the activation circuits (4-1 to 4-4) for the MOSFET switch (2-1 to 2-4).

\* \* \* \* \*